(12) United States Patent
Hohensee et al.

(10) Patent No.: US 8,681,368 B2
(45) Date of Patent: Mar. 25, 2014

(54) METHOD FOR DELIVERING RADIO FREQUENCY IDENTIFICATION DEVICE CONTROL AND DATA SIGNALS

(75) Inventors: Reinhard Heinrich Hohensee, Boulder, CO (US); Louis Stephen Sickenius, Longmont, CO (US); David Earl Stone, Longmont, CO (US); John Thomas Varga, Longmont, CO (US)

(73) Assignee: InfoPrint Solutions Company, LLC, Boulder, CO (US)

( * ) Notice: Subject to any disclaimer, the term of this patent is extended or adjusted under 35 U.S.C. 154(b) by 2292 days.

(21) Appl. No.: 11/092,251

(22) Filed: Mar. 29, 2005

(65) Prior Publication Data

US 2006/0227365 A1   Oct. 12, 2006

(51) Int. Cl.
*G06K 15/00* (2006.01)
*B41J 11/44* (2006.01)
*G08B 13/14* (2006.01)

(52) U.S. Cl.
USPC .......................... 358/1.16; 400/76; 340/572.1

(58) Field of Classification Search
USPC ............. 358/1.16, 1.15, 1.13, 1.1, 1.17, 1.14, 358/1.18, 1.12, 448; 101/211, 483; 715/205, 230, 246, 255, 705; 345/501, 345/502, 537, 672; 347/130, 132, 153, 154
See application file for complete search history.

(56) References Cited

U.S. PATENT DOCUMENTS

| | | | |
|---|---|---|---|
| 5,874,902 A | 2/1999 | Heinrich et al. | H04Q 1/00 340/825.54 |
| 6,100,804 A | 8/2000 | Brady et al. | G08B 13/14 340/572.7 |
| 6,407,821 B1 * | 6/2002 | Hohensee et al. | 358/1.15 |
| 6,520,544 B1 | 2/2003 | Mitchell et al. | B42D 15/00 283/70 |
| 6,768,419 B2 | 7/2004 | Garber et al. | G08B 13/14 340/572.4 |
| 6,899,476 B1 * | 5/2005 | Barrus et al. | 400/76 |
| 6,929,412 B1 * | 8/2005 | Barrus et al. | 400/76 |
| 2004/0044956 A1 | 3/2004 | Huang | G06F 17/00 715/511 |
| 2004/0141790 A1 | 7/2004 | Waters | B41J 11/26 400/611 |
| 2004/0239744 A1 * | 12/2004 | Otsuki | 347/105 |
| 2005/0058483 A1 * | 3/2005 | Chapman et al. | 400/76 |
| 2005/0116034 A1 * | 6/2005 | Satake et al. | 235/432 |

FOREIGN PATENT DOCUMENTS

| | | | |
|---|---|---|---|
| JP | 2004-124308 | 4/2004 | D21H 27/00 |
| WO | WO 2004/039599 A1 | 5/2004 | B41J 29/38 |

OTHER PUBLICATIONS

Zebra R402 Product Advertisement, Zebra Technologies International. LLC, Vernon Hills, IL.
DocumentiD RFID Document Management System, Sun Microsystems, UK.
RFID Journal, Sep. 4, 2003. Http://www.rfidjournal.com/article/articleview/556/1/1/.
PRWeb press release, Dec. 15, 2004 Http://www.prweb.com/releases/2004/10/prweb164347.htm.

(Continued)

*Primary Examiner* — David K Moore
*Assistant Examiner* — Neil R McLean
(74) *Attorney, Agent, or Firm* — Blakely, Sokoloff, Taylor & Zafman LLP

(57) ABSTRACT

A method of communicating non-native print objects in MO:DCA Architecture for controlling and operating RFID writer or reader devices without requiring separate control data streams or systems to be implemented at the host computer. Data references and command identifiers are placed by application program means at the host computer into the page description data so that RFID information can be retrieved and downloaded to the printer and RFID apparatus when the print data is being processed in the print server or main processor of the printer without interfering with normal operation of the printer itself.

19 Claims, 2 Drawing Sheets

(56) References Cited

OTHER PUBLICATIONS

Infoworld, IDG news services, 2004 "Japanese Bank taps RFID for Document Security" Kallender. http://www.infoworld,com/article/04/08/18/HNjapanrfid_1.html.

M.J. Back et al, "Page Detection using Embedded Tags", UIST. Proceedings of the 13$^{th}$ Annual ACM Symposium on User Interface Software and Technology, Nov. 5-8, 2000, Abstract.

M.J. Faber, "RFID: The Next Tool for Managing Records", Information Management Journal, vol. 36, No. 6, Nov.-Dec. 2002, Abstract.

H. Yasuura, "Towards the Digitally Named World—challenges for new social infrastructures based on information technologies", Proceedings. Euromicro Symposium on Digital System Design, 2003, Abstract.

M. Back, et al. "Listen Reader: An Electronically Augmented Paper-Based Book", CHI Mar. 31-Apr. 5, 2001.

H. Forcinio, "Encoding 'Smart' Labels on Demand", http://www.managingautomation.com/mainline/magazine/read.jspx?id=196622, Dec. 15, 2004.

PCT Search Report, PCT/EP2006/061106, mailed Nov. 11, 2006.

\* cited by examiner

METHOD FOR DELIVERING RADIO FREQUENCY IDENTIFICATION DEVICE CONTROL AND DATA SIGNALS

FIELD OF THE INVENTION

This invention relates generally to computer systems having printers that are provided with conventionally available Radio Frequency Identification Device (RFID) Writing and/or Reading apparatus for recording or reading information to or from an RFID memory device that may be included on or in a base printing medium on which the printer is to print. The RFID apparatus may be conveniently mounted on the carriage or printer head moving mechanisms to provide easy placement of the RFID apparatus relative to any RFID memory device chips that may be present on the base printing medium. More particularly, this invention relates to improved techniques for controlling the RFID apparatus by including the RFID apparatus control and data signals in the printer data stream provided by the computer system with which the printer is associated, or to which it may be connected via a network.

BACKGROUND OF THE INVENTION

Computer systems having hard copy page printers associated therewith are commonly known, as are the many forms of commercially available RFID memory devices and their associated radio frequency memory device recorders and readers by which the memory devices are either programmed or sensed and read. For example, the RFID technology is well established and may be understood in detail from the published RFID Handbook, Klaus Finkenzeller, 1999, John Wiley & Sons. Some RFID tag creation devices are already commercially available that combine a printer device for merchandise tags and incorporating therein suitable radio frequency memory device programming apparatus so that programmed RFID tags may be conveniently produced on a single machine. The embedding of RFID memory devices in paper media is also already known and has been proposed for numerous applications including tags for currency, important or secured documents, merchandise labels and tags and shipping and handling forms, to name but a few examples.

Using RFID technology, any article including a RFID programmed memory device may be automatically sensed as the article passes by an appropriate RFID reader, thereby making detection and tracking of the article in its movement an easy and convenient task. This enables a host of security and materials handling, control and accounting functions well-known to practitioners in the relevant fields of endeavor.

However, insofar as is known, the currently available technology requires separate means and data streams for creating article tags that bear RFID memory devices, one stream for the visible markings on the tag, and another data stream for controlling the RFID writing or reading apparatus, or the technology requires that either pre-recorded memory chips be applied to article tags printed in a printer, or that the completed printed tags and RFID memory chip assemblies be then passed by an RFID writing device separately to record the desired data in the memory chip. Either alternative is cumbersome and does not provide the flexibility that would be desired in today's mercantile or security applications where a host of different articles may be tracked throughout a site and for which it is necessary to prepare and affix numerous RFID tracking tags, each with possibly unique data recorded in a memory chip. It is inconvenient in the extreme to separately record the identification data in the chips for a plurality of separate articles unless one is tagging a plurality of identical articles with the same information.

One prior art approach to this task has been shown in Published United States Patent Application No. US 2004/0141790 A1 published Jul. 22, 2004 and assigned to the Hewlett-Packard Development Company, L.P. In this application, a combined printer and memory tag application and data memory chip writing device is shown. However, the main processor is required to send separate commands over separate paths to the print head mechanism and to the memory tag dispenser mechanism and to the data writing device in order to print on a paper sheet as required information is printed on its upper surface while at the same time the required memory tags have the necessary data written into them at the data writing device prior to being moved to and applied by a tag application device incorporated with the machine. Such separate control and data stream designs require that the host computer send to the memory tag printing and dispensing and writing device a whole sequence of separate data and control signals to be received by the device's main processor which, in turn, is required to separately control the printer head, the tag dispenser and the RFID writing or reading device. This requires special programming at the host computer and does not lend itself easily to creating paper documents formatted with written material and to locating and appropriately recording into or reading from RFID memory chips that are embedded in the print medium.

As will be readily appreciated by those skilled in the art of modern printing systems, the printing of documents requires a very complex data and control stream from the host computer to carry the pages of data to be printed. For example, as shown in U.S. Pat. No. 6,407,821 B1, issued Jun. 18, 2002 and commonly-assigned to the assignee of the present application, many modern printers are "intelligent" and are capable of storing commands and data, so that the print description for a page is commonly arranged to minimize the amount of information transferred to the printer over a data transfer path, such as a network. However, as shown therein, generally the print data stream is encoded by means of a page description language which describes the format of each page. Several conventional page description languages are POSTSCRIPT ® which is a print document description language developed by the Adobe Corporation, San Jose, Calif., or ENCAPSULATED POSTSCRIPT (EPS), also developed by the Adobe Corporation. Another formatting language, also developed by the Adobe Corporation is called the Portable Document Format (PDF) language. Still another is the page description language known as MO: DCA™ (Mixed Object Document Content Architecture), developed by the IBM Corporation and set forth in detail in the publication by IBM entitled "Mixed Object Document Content Architecture" Reference number SC31-6802, available from IBM.

These formatting languages each contain numerous repetitively used descriptive and control elements as shown in the aforementioned U.S. Pat. No. 6,407,821 B1 and, as detailed therein, improvements to reduce the repetitive nature of the downloaded information used to drive the printer are a highly-desired achievement. A mechanism for supporting the inclusion of data objects in the host computer output data stream to the printer for controlling and operating RFID writing or reading devices that may be incorporated therewith is most desired. However, within the context of MO:DCA architecture, a number of specified parameters necessary for controlling a printer are mandated for inclusion with each object destined for the printer, and many of these parameters are unsuitable for and are otherwise incompatible with RFID devices. Similarly, if data and control objects for RFID devices were available in the MO:DCA architecture, the included and mandated extraneous parameters required for proper recognition of commands and data at the printer would interfere with proper operation or routing of instructions and data to the RFID devices.

As detailed in the aforementioned, commonly-assigned patent, the IBM MO:DCA file format is designed to be used with a printing system known as the "Advanced Function Presentation" (AFP) printing system developed by, and available from, International Business Machines Corporation, Armonk, N.Y. This printing system has an intelligent print server which receives the print data and uses the references in the data stream to retrieve stored resources from a resource database. The resources are then downloaded to the printer ahead of the data. At the printer, the resources are then combined with the print data and sent to the rasterizer for printing. It is in this environment that our invention finds it's greatest utility, provided means and methods can be found for supporting the inclusion of non-print data objects in the data stream from the host computer which are intended for operating and controlling an RFID writing or reading apparatus in association with the printer receiving the data stream without interfering with the printer's tasks of formatting and printing the appropriate pages of information to create a document. Enabling a printer, under the control of a presentation data stream, to write (and/or read) information into (and/or from) a RFID chip embedded within or on a base printing medium is thus an object of the present invention. The base printing medium can be a sheet of paper intended for creating a printed paper document, a merchandise label, shipping container labels, or any other similar article, the presence of which is desired to be detected and traced with RFID technology.

SUMMARY OF THE INVENTION

In accordance with the principles of the invention, the print system and MO:DCA Architecture are extended to handle non-native print objects of the type necessary for controlling and operating RFID writer or reader devices without requiring separate control data streams or systems to be implemented at the host computer. Appropriate references and command identifiers are placed by application program means at the host computer into the page description data so that appropriate RFID information can be retrieved and downloaded to the printer and RFID apparatus when the print data is being processed in the print server or main processor of the printer without interfering with normal operation of the printer itself.

BRIEF DESCRIPTION OF THE DRAWINGS

The foregoing and other objects and advantages of the invention will be appreciated more fully from the following further description thereof with reference to the accompanying drawings, wherein.

DETAILED DESCRIPTION OF ILLUSTRATIVE EMBODIMENTS

Figure 1:
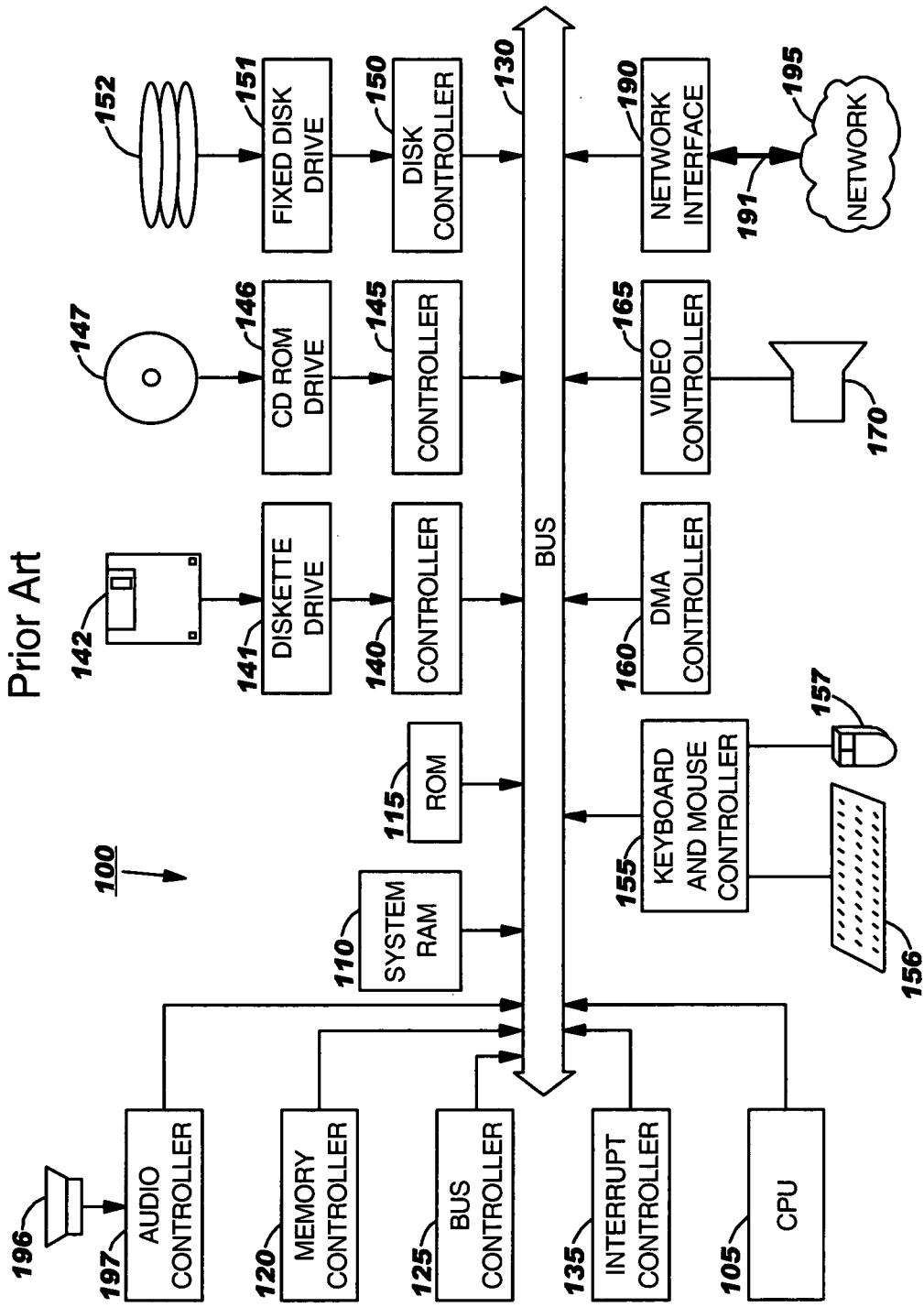
FIG. 1 illustrates the system architecture for a conventional exemplary computer system on which the preferred embodiment of the invention can be implemented.

The invention will be detailed and described with reference to an exemplary creation of a "Smart" document by use of a printer system having RFID writing and/or reading apparatus in association with the print head and carriage mechanism of the printer. It will be described in the context of the IBM AFP environment in which data objects are communicated in a data stream from an application program running on an exemplary host processor and sent via any suitable communication means to a printer control processor either with or without the intervention of a printer server device. In this context, the data objects inserted into the control and data stream by the host computer system will be called "smart objects" to distinguish them from the usual printing control and data formatting objects and data carried in the data stream.

As defined herein, "smart objects" are data and control structures containing the information required to locate, identify, write into or read from an RFID memory and communication chip located anywhere on a sheet of paper or any other suitable base print medium. In this sense, "smart objects" enable the functionality of the RFID apparatus in a manner similar to the enablement of the printer mechanisms and formatting carried out by the usual AFP system handling included page-level data and control objects. In accordance with the invention, a data stream is built consisting of pages and the pages consist of various data objects, some of which may be "smart objects".

The data objects can be included directly on the defined page data, or they can be referenced as resources using a Mixed Object Document Content Architecture Include Object (IOB) structured field of data. This is also referred to herein as a MO:DCA Include Object structured field in the data stream. The IOB specifies to the printer server and/or the printer controller the type of object being included using a newly-defined Object Classification triplet, Hexadecimal '10', which identifies the data or control object type as a "smart object" using a MO:DCA-Registered Object Identifier (OID).

The IOB also specifies the presentation parameters for the object, such as object area size, area position, relative rotation, and the like. The objects are sent to the presentation device (printer and RFID writer and/or reader in the present context) using Intelligent Printer Data Stream (IPDS) commands. The presentation device has a main processor which may be the print server and/or the printer control unit either together or separately, for rendering the data objects for each type of data that can be included on a page, including, of course, the data for locating, writing to or reading from a RFID memory device chip located on the base printing medium. In the architected system using IPDS commands, each object is sent to the presentation device in an appropriate "wrapper" or logical "container" which sets the data objects apart and is used by the rendering processor to parse the data stream, extracting and routing the appropriate data and control signals to the appropriate device for execution. As shown in the aforementioned, commonly-assigned US patent, incorporated herein by reference for the detail of it's teaching of the structures, techniques, architecture and operation of such systems, the "container" carries the actual object data and identifies the object type using a MO:DCA-registered identifier object-type OID.

Turning now to FIG. 1, the system architecture for an exemplary client computer 100, such as an IBM THINKPAD 701® computer, on which the control of the disclosed printing system and RFID writer/reader system can be implemented. The exemplary computer system of FIG. 1 is discussed only for descriptive purposes, however, and should not be considered a limitation of the invention. Although the description below may refer to terms commonly used in describing particular computer systems, the described concepts apply equally to other computer systems, including systems having architectures that are dissimilar to that shown in FIG. 1.

The client computer 100 includes a central processing unit (CPU) 105, which may include a conventional microprocessor, random access memory (RAM) 110 for temporary storage of information, and read only memory (ROM) 115 for permanent storage of information. A memory controller 120 is provided for controlling system RAM 110. A bus controller 125 is provided for controlling bus 130, and an interrupt controller 135 is used for receiving and procession various interrupt signals from other system components.

Mass storage may be provided by diskette 142, CD-ROM 147, or hard disk 152 Data and software may be exchanged with client computer 100 via removable media, such as diskette 142, and CD-ROM 147. Diskette 142 is insertable into diskette drive 141, which is connected to bus 130 by controller 140. Similarly, CD-ROM 147 is insertable into CD-ROM drive 146, which is connected to bus 130 by controller 145. Finally, the hard disk 152 is part of a fixed disk drive 151, which is connected to bus 130 by controller 150.

User input to the client computer 100 may be provided by a number of devices. For example, a keyboard 156 and a mouse 157 may be connected to bus 130 by keyboard and mouse controller 155. An audio transducer 196, which may act as both a microphone and as a speaker, is connected to bus 130 by audio controller 197. It should be understood and obvious to those reasonably skilled in the art that other input devices, such as a pen and/or a tablet and a microphone for voice input may be connected to client computer 100 through bus 130 and an appropriate controller. DMA (Direct Memory Access) controller 160 is provided for performing direct memory access to system RAM 110. A visual display is generated by a video controller 165, which controls video display 170. Also included in FIG. 1, is a communications adapter 190 connected to a network for communications 195 over a suitable medium 191. Medium 191 can be either a tangible medium, including but not limited to optical or analog communications lines, or it may be implemented with wireless techniques, including but not limited to microwave, infrared, or other transmission techniques known now or in the future. Medium 191 may also be the Internet, accessed with the usual interface and protocol means well-known in the communications arts.

Client computer system 100 generally is controlled and coordinated by an operating system software running on the computer 100, such as the commonly-available WINDOWS® operating systems available from the Microsoft Corporation, Redmond, Wash., or the AIX® operating system available from the International Business Machines Corporation, Armonk, N.Y. Among other computer system control functions, the operating system controls allocation of system resources and performs tasks such as process scheduling, memory management, networking and input-output (I/O) services.

Figure 2:
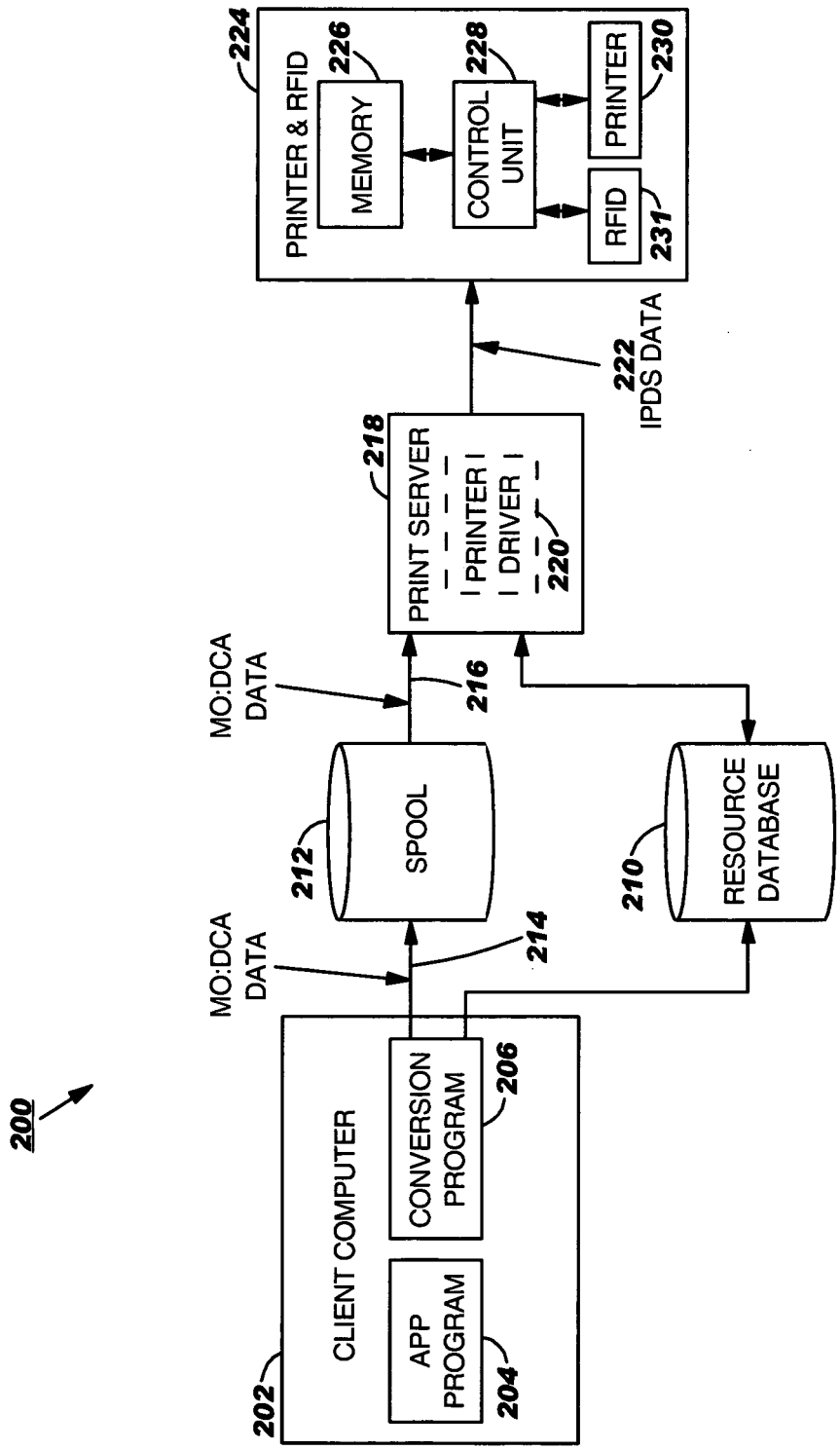
FIG. 2 is a schematic drawing of an Advanced Function Presentation system for printing a document produced by an application program and for operating an RFID writer or reader apparatus using the same main processor as used by the AFP printer.

FIG. 2 illustrates a conventional AFP printing system 200, modified in accordance with the principles of a preferred embodiment of the invention herein, for printing a print document produced by an application program 204 running on a client computer 202. The client computer 202 may be any computer, one of which is described above. In addition, the application program 204 produces the control and data signals necessary for controlling and operating a RFID writer and/or reader device included with the printer 224. The application program 204, running on the client computer 202, generates a structured data stream that contains page description information as well as RFID control and data for smart objects to be included on a printed page. For example, the page description information contains print data objects and smart objects in accordance with the invention.

The print document description is provided to a conversion program 206 which generates the data stream 214 which is a fully-specified, formatted, platform, device and resolution independent logical description of the print document and its smart object contents. In the process of forming the data stream, the conversion program 206 stores certain information, such as fonts and formatting information, location of RFID memory device on the print base media, the data for the RFID device and control information therefore in a common database, called a resource database, 210. The conversion program 206 then generates a logical description of the overall document with references to information stored in the resource database 210. In particular, such a logical description of a data stream utilized for printing in the AFP system is presented in the aforementioned MO:DCA format containing references to the resources stored in database 210 and discussed in more detail below. The print and RFID control and data in MO:DCA format contains references to the resources stored in database 210 which may be conveniently stored on spool 212. Resources may also be carried in a resource group of data that is part of the actual print and RFID control file. Such resources are referred to as "in-line" resources in the AFP system.

The spool 212 both stores and spools the MO:DCA data stream 214 representing the print document and RFID controls and data from the conversion program 206. The spooled output data stream 216 is transmitted to a print server 218 that converts the device-independent print specifications, together with any RFID device independent specifications, to a device specific data stream by means of a printer driver 220, which regards the RFID device as simply part of the printer's capabilities that may be invoked by means of driver 220, and the resource database, 210. Optionally, as indicated by the dashed line around RFID driver 229 in FIG. 2, if the printer Driver 220 is not re-written to support the necessary RFID driver code, a separate set of RFID drivers, 229, may be included in the Server 218, or, as is most usually the case with modern intelligent printers such as printer 224, the driver capability may be included in the control unit 228 for the printer, thus removing this task from the server 218 entirely.

The resource database 210 is utilized to convert the MO:DCA data stream to a print and RFID data stream including details of a physical medium using a process called "outboard formatting". The resulting data stream 222, called an Intelligent Printer Data Stream™ (IPDS™, trademark of IBM Corporation, Armonk, N.Y.) is sent to the printer and RFID writer/reader unit, 224.

The printer and RFID writer/reader unit 224 has a control unit 228 with which print server 218 can communicate and it has an internal memory 226. The control unit 228 operates the appropriate printer device 230 or the RFID apparatus 231 using the control and data signals provided by the print server 218 or is generated internally by the control unit 228. The communications between the print server 218 and the printer/RFID device is bidirectional. For example, the print server 218 may inquire of printer/RFID device 224 whether a particular resource, such as a font or a specific smart object is currently resident in the printer memory 226. If the resource is not currently present, print server 218 can retrieve the desired information from resource database 210 and download it using a data stream 222 into memory 226. The resource will then be available for future use. Subsequently, when print data or RFID data refers to the downloaded resource is received by the printer/RFID device 224, the device will combine the resource with the data and provide the combination to a conventional Rasterizing Image Processor (called a RIP, not shown in FIG. 2) which converts the print data into a printable graphic image. In like manner, if the data is directed by the contents of the IPDS data stream to the RFID device, the control unit 228 will convert the RFID data into RF-writable format and/or will direct the RFID reader to input the data read from an RFID memory device on the printed base medium.

A generalized representation of a page description data stream containing RFID identified data or controls is communicated in a structured data stream to contain a smart object specified in MO:DCA protocol for data formatted for a page using an Include Object Identifier (IOB) to the print sever 218 in accordance with the MO:DCA protocol as follows:

Begin Page (BPG)
  Begin Active Environment Group (BAG)
  (Active Environment Group data)
  End Active Environment Group (EOG)
  Include Object (IOB)
  <Smart Object Name>
  <Object Classification triplet, object-type OID=smart object>
  <Size of target area for object—might not be used>
  <Position of target area—might not be used>
  <Position of object in target area—might not be used>
    <Rotation of target area—ignored>
    <Mapping to target area—limited to "position">
  End Page (EPG)

Note that in the above example, some of the MO:DCA-required presentation parameters used to include presentation data objects are not appropriate to or relevant for smart objects. For example as shown, rotation, scaling, trimming and the like operations for print objects do not apply to smart objects to be read or written by RFID devices. Even the position parameter might not apply if the smart-object writer device is set to write to a fixed location on the paper. However, the current MO:DCA architecture requires that these parameters all be specified or defaulted and used. Therefore, this invention provides new semantics to allow smart objects to be processed using only the relevant parameters that apply to smart objects. Unneeded parameters such as rotation, scaling and trimming are ignored if specified for a smart object. The mapping parameter specified by the last statement in the example above just before the EPG is currently defined for a variety of printing presentation mappings such as: scale-to-fit, scale-to-fill, center-and-trim, position-and-trim, replicate-and-trim, and position itself. Of these, only position itself is relevant to smart objects and a special value of Hexadecimal "FFFF" is used in the "position of target area" parameter to indicate to the device controller that smart object data is to be written to an RFID chip located on the page at a pre-defined position. If other values are placed within the "position of target area" and the "position of object in target area" parameters, it would indicate to the controller that a specific location on the base print medium was to be accessed and written to or read from. As a simple example of how the system can read from an RFID chip, we define a "Read RFID: mapping option that allows either the "position" parameter command or the "Read RFID" parameter command to be used with smart objects. The "Read RFID" parameter directs the printer and RFID device 224 to read data from an RFID chip on a particular page. This may be done either after data has been written or in place of writing to the chip, and can be used for verification purposes to ascertain that the correct media has been selected or can be used to make decisions based on what was read from the RFID chip.

One RFID chip on a single sheet of paper or other print base medium is, in all likelihood, the normal application one would envision for use of RFID technology, but the data stream architecture allows for multiple smart objects to be defined within a single page, each one positioned independently of the others. More sophisticated applications therefore might require multiple RF programming modules, or movement of the print head and RF-writer assembly to another location on the base print medium for recording or reading another RFID chip.

The smart object to be written by the RFID device (or a request that the RFID device read from a chip on a particular page) can be placed directly into the AFP data stream using a MO:DCA-defined object container specified within a MO:DCA page as shown by the example below:

Begin Object Container (BOC)
    <Object Classification triplet, object-type OID=smart object>
  Begin Object Environment Group (BAG)
    Object Area Descriptor (OBD)
      <Size of target area—might not be used>
    Object Area Position (OBP)
      <Position of target area-might not be used>
        <Position of object in target area—might not be used>
        <Rotation of target area—ignored>
  Map Container Data (MCD)
    <Mapping to target area—limited to "position">
  Container Data Descriptor (CDD)
  End Object Environment Group (EOG)
  Object Container Data (OCD)
    <Smart object data>
  Object Container Data (OCD)
  End Object Container (EOC)

This example shows the inclusion of the smart object data carried within a series of "OCD" indicators. This structure would have to be created and passed to the spool 212 by the client computer 202 running the application program 206 which is used for generating the smart object commands and data each time the operation of the RFID device is desired.

The Printer Driver 220 uses a simple method of providing a smart object to an IPDS printer and RFID device and for associating the smart object with the proper page of a print document and on the proper sheet of paper in the document; it sends appropriate IPDS commands in an object container to the printer and RFID device 224 within the page formatting state. The following diagram gives an example of the sequence of IPDS commands needed to provide a smart object to the print server during page formatting state.

Begin Page (BP)
  <Page data>
  Write Object Container Control (WOCC)
  Write Object Container (WOC)
  <Smart object data and controls>
  End
  <Further Page data, if any>
  End Page (EP)

In the foregoing example, the WOCC command specifies the parameters from the MO:DCA structured fields for OBD, OBP, MCD and CDD data structures. Similarly, this command can specify analogous parameters from the IOB structured field to include a resource from the resource database 210 or from the client computer 202 that describe and control the smart object. A series of WOC commands, as many as are necessary for the desired task, carry the actual smart object data from the MO:DCA OCD structured fields. The END command identifies to the print server 218 the end of the smart object data.

Yet another method of communicating the necessary smart object controls and data to the printer and RFID device 224 is to generate the necessary parameters at the print server 218 using the concept of IPDS resources as set forth in the aforementioned, commonly-assigned U.S. Pat. No. 6,407,821 B1. An example of this technique follows:

Write Object Container Control (WOCC)—begins downloading of a resource
    Write Object Container (WOC)
        <Object Data>
    Write Object Container (WOC)
    End
    Begin Page (BP)
    <Page data>
    Include Data Object (IDO)—includes the resource referenced in the IDO onto the page
    <Further Page data, if any>
    End Page (EP)

In the above example, the resource object must have been mapped by a MO:DCA Map Data Resource (MDR) structured field to cause the Printer Driver 220 to download the resource in home state. The WOCC command specifies the parameters from the MO:DCA defined OBD, OBP, MCD and CDD structured fields from the object itself. The Include Data Object (IDO) command specifies the parameters from the MO:DCA-defined IOB structured field.

As a simple example of how RFID capability may be used from a database, consider the following: Suppose a user has a database containing information that needs to be printed in a report. This is accomplished by submitting a printing job to the printer 224 using a page definition (usually "PAGEDEF") command stream. PAGEDEF is an AFP object containing the formatting instructions that describe for the printer how each database item (object) is placed into the pages of the desired printed report. This is the conventional method that has been used for several years in normal AFP printing jobs. The Application Program 204 in FIG. 2, executing in client computer 202, extracts lines of data from the database 210 as part of the print job submission.

Now, suppose that the user wished to include a page in the printed report that included an RFID memory device, programmed so as to enable tracking of the final printed document, making it a "smart" report document. Two things must occur: First, the user must print the report using a sheet of paper that contains an appropriate RFID chip, and, secondly, PAGEDEF must be changed to contain an IOB for including a smart or secure object. The datastream controls used in the PAGEDEF are identical to the ones described above for the MO:DCA formatted examples. When using a PAGEDEF, the Printer Server 218 converts the lines of user input data into the actual report by following the instructions within the PAGEDEF. What is new here is that a smart object can be associated with the printed report without requiring any changes to the database itself.

The processing of a smart object in the processor or control unit 228 of the printer and RFID device 224 begins by accessing the contents of the IPDS WOCC/WOC commands to position the antenna of the RFID writer for writing to the RFID chip on the print base medium and to specify the particular information (data) to be written to the chip. The data in the WOC may refer to pre-written smart objects that may be located and modified, for example, pre-written check numbers or other document material that may be correlated to verify that the proper page is ready to print or to be written.

Positioning of the RF antenna of a RFID writer presumes that the location of the RFID chip is known and/or can vary only in accordance with a manufacturer specification. Also, there could be a plurality of smart chips on a single base print medium, so if the technology requires placement of the RF field of the RFID writer to write the data into the chip(s), then that antenna placement is specified by the WOCC/WOC commands. Multiple chips can be programmed or written by timing the movement of the print head and RFID writer assembly. The RFID Writer module also uses the data to perform control functions such as determining the identity of prerecorded chips and flagging writing errors. It is known in the art to use the RFID Writer/Reader in such fashion as shown by the aforementioned published US patent application.

A software implementation of the above-described embodiments and techniques may comprise a series of computer executable instructions either fixed on a tangible medium, such as a computer readable media, e.g. diskette 142, CD-ROM 147, ROM 115 or fixed disk 152 of FIG. 1, or such instructions may be transmitted to a computer system via a modem or other interface device, such as a communications adapter 190 connected to a network for communications 195 over a suitable medium 191. Medium 191 can be either a tangible medium, including but not limited to optical or analog communications lines, or it may be implemented with wireless techniques, including but not limited to microwave, infrared, or other transmission techniques known now or in the future. Medium 191 may also be the Internet, accessed with the usual interface and protocol means well-known in the communications arts.

The series of computer executable instructions embodies all or part of the functionality previously described herein with respect to the invention. Those skilled in the relevant art will appreciate that such computer instructions can be written in a number of programming languages for use with many computer architectures or operating systems. Further, such instructions may be stored using any memory technology, present or future, including but not limited to, semiconductor, magnetic, optical or other memory devices, or transmitted using any communications technology, present or future, including but not limited to optical, infrared, microwave or other transmission technology. It is contemplated that such a computer program product may be distributed as a removable medium with accompanying printed or electronic documentation, e.g. shrink-wrapped software, pre-loaded with a computer system, e.g., on a system ROM or fixed disk, or distributed from a server or electronic bulletin board over a network such as the Internet or World Wide Web.

Although exemplary embodiments of the invention have been disclosed and described in detail above, it will be apparent to those skilled in the art that various changes and modifications can be made which will achieve some of the advantages of the invention without departing from the spirit and scope of the invention. It will be obvious to those reasonably skilled in the art that the disclosed method, apparatus and programs can be extended to other page description languages and that the methods of the invention may be achieved in all-software implementations, or hybrid implementations which utilize combinations of hardware logic and software logic to achieve the same results.

What is claimed is:

1. A method comprising:
    placing print document data into a page description language (PDL) data stream at a computer;
    placing radio frequency identification (RFID) data objects into the PDL data stream;

placing an RFID data object identifier into the PDL data stream to distinguish the RFID data objects from the print document data;

detecting said RFID data object identifier at the printer control means;

delivering any RFID data or commands indicated by said RFID data object identifier to an RFID means for writing or reading RFID memory devices at a printing base medium; and delivering the print document data to a printing means at the printing base medium.

2. A method as described in claim 1, further comprising steps of:

extracting from a database any RFID commands or data indicated by said RFID data object identifier, and delivering said extracted RFID commands or data to said RFID means for use thereby.

3. A method as described in either claim 1 or claim 2, further comprising steps of:

detecting said identifier for RFID data objects in said printer data stream and, responsive thereto, downloading RFID data and commands indicated by said RFID identifier from said computer to said printer server or printer control means; and delivering said RFID data and commands to said RFID means.

4. A method as described in claim 3, further comprising steps of:

recording said downloaded RFID data and commands into a database for later extraction therefrom for delivery to said RFID means.

5. A computer program comprising a non-transitory computer useable medium having computer readable program code thereon, including:

program code placing print document data into a page description language (PDL) data stream at a computer;

placing radio frequency identification (RFID) data objects into the PDL data stream;

placing an RFID data object identifier into the PDL data stream to distinguish the RFID data objects from the print document data;

program code for detecting said RFID data object identifier at the printer control means;

program code for directing any RFID data or commands indicated by said RFID data object identifier to an RFID means for writing or reading RFID memory devices at a printing base medium; and program code for directing the print document data to a printing means at the printing base medium.

6. A computer program product for delivering control and data objects to a RFID writer or reader means in a printer means as described in claim 5, the computer program product comprising a computer useable medium having computer readable program code thereon, further including:

program code for extracting from a database any RFID commands or data indicated by said RFID data object identifier, and program code for delivering said extracted RFID commands or data to said RFID means for use thereby.

7. A computer program product for delivering control and data objects to a RFID writer or reader means in a printer means as described in claim 5 or claim 6, the computer program product comprising a computer useable medium having computer readable program code thereon, further including:

program code for detecting said identifier for RFID data objects in said printer data stream and, responsive thereto program code for downloading RFID data and commands indicated by said RFID identifier from said computer to said printer server or printer control; and program code for delivering said RFID data and commands to said RFID means.

8. A computer program product as described in claim 7, further comprising:

program code for recording said downloaded FRID data and commands into a database for later extraction therefrom for delivery to said RFID means.

9. A computer program comprising a non-transitory computer useable medium having computer readable program code thereon, including:

program code for examining resource data of each of print objects and radio frequency identification (RFID) objects and for storing a single copy of resource data and discarding any duplicate copies;

program code for inserting into a formatted data stream print data and RFID data and a reference to the resource data at the point in the formatted data stream where the print or RFID object is to be read or written on a page;

program code for using the resource data reference in the formatted data stream to retrieve the resource data copy;

program code for sending the retrieved resource data copy having RFID objects to an RFID means at a printer for reading or writing to an RFID memory means;

program code for sending the retrieved resource data copy having print objects to a printing means at the printer;

program code which uses the RFID data reference to send the referenced RFID data and the resource data reference to the RFID means and uses the print data reference to send the referenced print data and the resource data reference to the printing means; and program code for combining the resource data and the print or RFID data in the printer in response to the resource data reference; and program code for processing the combination for writing or reading by said RFID means and for processing the combination for printing at the printing means, program code for directing any RFID data or commands indicated by said RFID data object identifier to an RFID means for writing or reading RFID memory devices at a printing base medium; and program code for directing the print document data to a printing means at the printing base medium.

10. A program product as described in claim 9 wherein the RFID data in the formatted data stream comprises actual RFID data content to be written into the RFID memory device on the print base medium.

11. A computer program product as described in claim 9 wherein the RFID data in the formatted data stream comprises a reference to the actual RFID data content to be written.

12. A computer program product as described in claim 9 wherein the examining program code comprises program code for storing the RFID data of each of the RFID objects in the formatted data stream into a resource database.

13. A computer program product as described in claim 12 wherein the program code which uses the RFID data reference to send the referenced RFID data and the resource data reference to the RFID means comprises program code for retrieving the RFID data from the resource database in response to the RFID data reference; and program code for sending the retrieved RFID data to the RFID means.

14. A computer program product as described in claim 9 wherein the examining program code comprises program code for storing the resource data of each of the RFID objects in a resource database.

15. A computer program product as described in claim 9 wherein the examining program code comprises program code for storing the resource data of each of the RFID objects in the formatted data stream.

16. A computer program product as described in claim 9 wherein the program code for inserting references into the formatted data stream comprises program code for inserting into the formatted data stream a second reference to the resource data together with the reference to the RFID data at the point in the formatted data stream where the RFID object is to be written or read.

17. A computer program product as described in claim 16 wherein the program code for sending the resource data reference and the RFID data to the RFID means comprises program code for sending the second resource data reference and RFID data to the RFID means.

18. A computer program product as described in claim 9 wherein the program code for sending the resource data copy to the RFID means comprises:
   program code, operable before sending the resource data copy to the RFID means, for determining whether the RFID means already has a copy of the retrieved resource data; and
   program code for preventing a resource data copy from being sent to the RFID means when the RFID means already has a copy of the resource data.

19. A computer program product as described in claim 18 wherein the RFID means has a memory and the program code for sending the resource data copy to the RFID means comprises program code for storing the resource data copy in the memory.

* * * * *

UNITED STATES PATENT AND TRADEMARK OFFICE
CERTIFICATE OF CORRECTION

PATENT NO.        : 8,681,368 B2  
APPLICATION NO.   : 11/092251  
DATED             : March 25, 2014  
INVENTOR(S)       : Hohensee et al.

It is certified that error appears in the above-identified patent and that said Letters Patent is hereby corrected as shown below:

In the Claims

Claim 8, column 12, line 8 delete, "FRID" and insert -- RFID --.

Signed and Sealed this
Twenty-ninth Day of July, 2014

Michelle K. Lee
*Deputy Director of the United States Patent and Trademark Office*